Nov. 21, 1950     K. BREUNING     2,530,938
PLUNGER TYPE PHOTO FLASH SWITCH
Filed Feb. 21, 1946
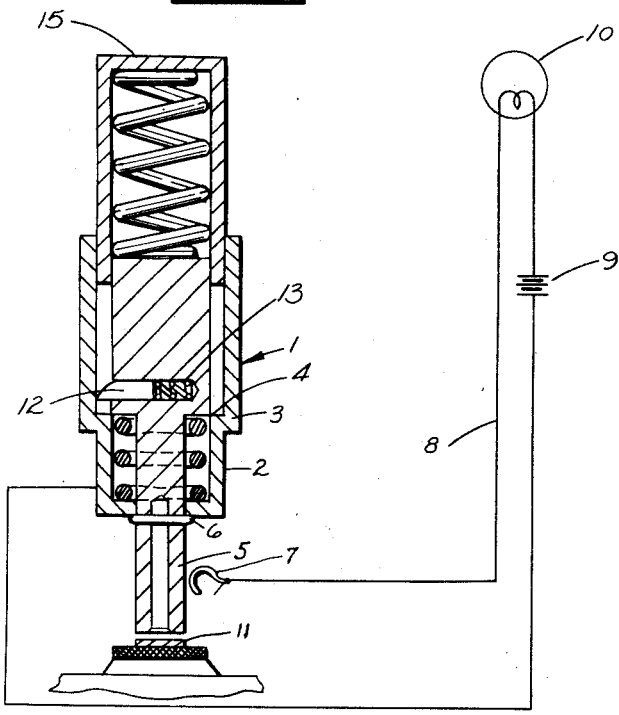
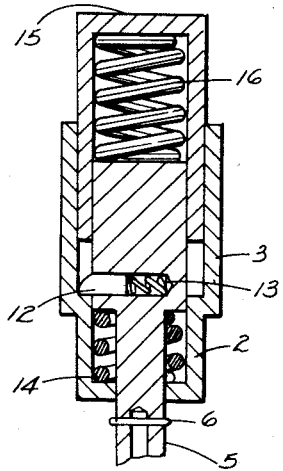
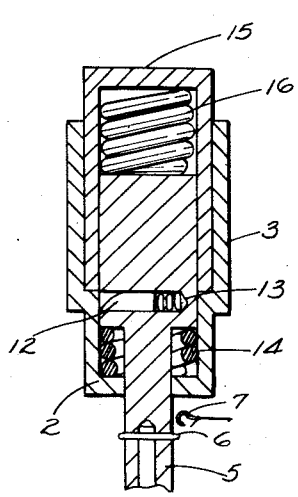
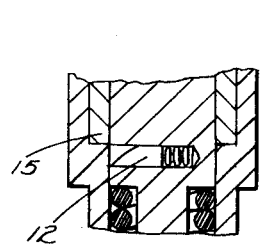
INVENTOR.
KARL BREUNING
BY *Pineles & Greene*
ATTORNEYS Patented Nov. 21, 1950

2,530,938

UNITED STATES PATENT OFFICE 2,530,938

PLUNGER TYPE PHOTOFLASH SWITCH

Karl Breuning, Flushing, N. Y.

Application February 21, 1946, Serial No. 649,250

1 Claim. (Cl. 74—110)

My invention relates to a new and novel plunger type photo flash switch. More particularly it relates to a photo flash switch for operating a camera with a flash bulb attachment.

It is an object of my invention to provide a photo flash switch which is useful to set off a flash bulb and operate the shutter of a camera simultaneously.

It is a further object of my invention to provide a simple switch operated by a push button to ignite a photo flash bulb and snap the shutter of a camera at the same time.

These objects and others ancillary thereto I prefer to accomplish by providing a switch operating against the resistance of some resilient means containing a trigger mechanism which suddenly releases a plunger to ignite a flash lamp and operate a shutter of a camera.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing, in which:

Figure 1 is a side view substantially in cross section of the switch and flash bulb circuit.

Figures 2 to 4 are detailed views illustrating the operation of the switch of Figure 1.

In order for a switch of this type to operate satisfactorily, the electric current which ignites the flash bulb must be applied at precisely the same moment as the shutter mechanism is operating.

To accomplish this result, I prefer a housing 1 which comprises a lower cylindrical sleeve 2 and an upper cylindrical sleeve 3 of larger diameter than the lower sleeve portion with a shoulder or flange portion 4 connecting the two sleeves.

A metal plunger 5 adapted to push against a shutter mechanism is mounted to slide in the lower part of the cylindrical housing 3. The lower part of this plunger extends through an orifice in the bottom of 2. On this metal plunger there is mounted a contact element 6 shown in the figures as an enlarged ring portion surrounding the plunger. An electrical circuit containing a battery 9, wiring 8, and a flash bulb or socket therefor 10, is connected to the housing 1. This circuit is not closed but contains a contact element 7 which is positioned close to the plunger mechanism 5 so that when the plunger mechanism 5 moves downwardly the raised portion 6 on 5 makes instantaneous contact with 7, thereby completing the circuit and igniting the flash bulb.

Shown below the plunger 5 is a representation of a shutter operating mechanism 11 which the plunger 5 is adapted to operate in its downward movement. The plunger is continually held in operative position by a spring 14 and also by a latch mechanism 12. In the upper part 3 of the housing 1 is provided a push button mechanism 15. This push button mechanism is shaped so that it slides easily between the upper part of the casing and the upper part of the plunger. The push button and the plunger are urged away from each other by some resilient means, such as the spring 16. The latch mechanism 12 is so shaped as to prevent any substantial downward movement of the plunger before the latch is released. The lower rim of the push button 15 is of such a length that it can be pushed against the latch mechanism 12 and can release the latch 12 against the action of the latch spring 13.

The operation of this device is as follows: A flash bulb is inserted in the socket provided therefor, and the switch is attached to the camera in any suitable way so that the plunger 5 is located to operate the shutter mechanism of the camera. Upon pushing the push button 15 downwardly, considerable pressure is built up by compression of the spring 16 between the push button 15 and the plunger 5. The plunger 5, however, moves a very small amount because it is held in place by the latch 12. This is shown in Figure 2. On further compression of the push button 15, the latch mechanism 12 is moved inwardly of the plunger against the action of the spring 13, as shown in Figure 4. Thus, the plunger is suddenly released with relatively high pressure applied thereto, and in its quick downward movement the contact element 7 ignites the flash bulb 10 and simultaneously operates the shutter mechanism 11. When the pressure is released, the springs 14 and 16 again urge the plunger and the push button back to their original position and the spring 13 automatically locks the plunger by means of the latch 12 against downward movement.

It will be seen, therefore, that I have provided a novel and useful mechanism for the accurate timing of the photo flash camera device.

Although I have shown and described certain specific embodiments of my invention, I am fully away that many modifications thereof are possible. My invention, therefore, is not to be re-